United States Patent
Schlapfer

[15] 3,696,097
[45] Oct. 3, 1972

[54] HETEROCYCLIC SUBSTITUTED VINYL-V-TRIAZOLES OF THE COUMARIN SERIES, AND THEIR USE FOR THE OPTICAL BRIGHTENING OF ORGANIC MATERIALS

[72] Inventor: Hans Schlapfer, Basel, Switzerland

[73] Assignee: Ciba-Geigy Corporation, Ardsley, N.Y.

[22] Filed: June 4, 1970

[21] Appl. No.: 43,564

[30] Foreign Application Priority Data

June 13, 1969 Switzerland............9055/69

[52] U.S. Cl............260/240 E, 106/176, 117/33.5 T, 252/301.2 W, 252/524, 252/542, 260/37 NP, 260/37 P, 260/75 T, 260/75 S, 260/91.3 VA, 260/92.8, 260/94.9 GD, 260/240 G, 260/308 A
[51] Int. Cl............................................C07d 55/02
[58] Field of Search.260/240 E, 240 C; 252/301.2 W

[56] References Cited

UNITED STATES PATENTS 3,501,490  3/1970  Maeder et al.............260/307

OTHER PUBLICATIONS

Netherlands Published Application No. 6800021, pp. 1, 1a, 2– 4, 10, 11, 12– 15 and 1 dwg. relied upon, published July 8, 1968

*Primary Examiner*—John D. Randolph
*Attorney*—Karl F. Jorda and Martin J. Spellman

[57] ABSTRACT

New 2-[3-arylcoumarinyl-(7)]-4-aryl-vinyl-v-triazoles are brighteners of high-molecular organic materials. The compounds are obtained by splitting off water from isnitrosoarylidene-acetone[-3-aryl-coumarinyl-(7)]-hydrazone.

4 Claims, No Drawings

HETEROCYCLIC SUBSTITUTED VINYL-V-TRIAZOLES OF THE COUMARIN SERIES, AND THEIR USE FOR THE OPTICAL BRIGHTENING OF ORGANIC MATERIALS

DESCRIPTION OF INVENTION

The present invention relates to new v-triazoles substituted in the 4-position by a heterocyclic group and containing, in the 2-position, a coumarinyl-(7)-group substituted in the 3-position, also to the use of these compounds for the optical brightening of synthetic and natural organic materials, as well as to processes for the production of the compounds.

3-Phenyl-coumarins containing in the 7-position a further substituted v-triazole group have already been suggested as optical brighteners. Some of them, e.g., the compounds substituted by a 4,5-areno-v-triazolyl-(2)-group, produce undesired greenish white effects or possess too strong a yellow inherent color and have, moreover, relatively poor fastness to light in that they turn yellow after prolonged exposure to light. On the other hand, the new compounds are distinguished, compared to known 7-v-triazolyl-(2)-coumarins substituted in the triazole ring by alkyl, aralkyl or aryl groups, by a particularly high molecular extinction and a therewith associated very high degree of whiteness of the brightened material. The new arylvinyl-v-triazoles of the coumarin series correspond to the formula I,

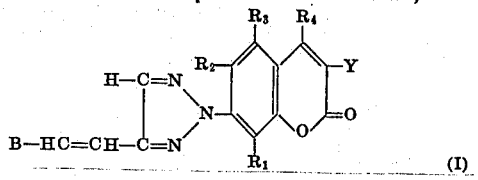

wherein
B represents a mononuclear, aromatic heterocyclic group,
$R_1$ to $R_4$ represent hydrogen or a lower alkyl group and
Y represents a mononuclear, carbocyclic or heterocyclic aryl group in conjugation with the coumarin ring.

For optical brightening, compounds are preferred in which $R_1$ to $R_4$ denote hydrogen atoms, because they are more easily accessible than such compounds having alkyl groups in the coumarin ring. Especially preferred are the compounds in which $R_1$ to $R_4$ represent hydrogen atoms, Y represents the phenyl group and B denotes, in particular, the optionally substituted thienyl or furyl group. Suitable as substituents of the thienyl or furyl ring B are, in particular, chlorine atoms, sulfo, alkylsulfonyl, sulfonic acid amide, carboxylic acid and carboxylic acid amide groups and carboxylic acid alkyl ester groups such as ethyl or methyl ester.

The compounds according to the invention are distinguished by good compatibility with high-molecular organic substances. The new optical brighteners are suitable for the brightening of high-molecular materials such as polyolefins, e.g., polyethylene or polypropylene, also polyvinyl chloride, particularly, however, polyesters, especially polyesters of aromatic polycarboxylic acids with polyvalent alcohols such as polyterephthalic acid glycol ester, synthetic polyamides such as Nylon-6 and Nylon-66, but also cellulose esters such as cellulose acetates, and also for the brightening of cellulose. Suitable for the brightening of cellulose substrates are, in particular, such compounds which contain water-solubilizing groups such as, e.g., the sulphonic acid group.

The optical brightening of the high-molecular, colorless, organic material is performed, for example, by incorporating into this material small amounts of optical brighteners according to the invention, preferably 0.001 to 1 percent relative to the material to be brightened, optionally together with other additives such as softeners, stabilizers or pigments. The brighteners can be worked into the synthetic materials, e.g., dissolved in softeners such as dioctylphthalate, or together with stabilizers such as dibutyl tin laurate or sodium pentaoctyl tripolyphosphate, or together with pigments such as, e.g., titanium dioxide. Depending on the nature of the material to be brightened, the brightener may also be dissolved in the monomers before polymerization, in the polymer mass, or together with the polymers in a solvent. The material pre-treated in this manner is afterwards processed into the desired ultimate form by methods known per se, such as calendering, pressing, extrusion, coating, moulding and, in particular, by spinning and stretching. The brighteners can also be worked into finishings, e.g., into finishings for textile fibers such as polyvinyl alcohol, or into resins or resin pre-condensates such as, e.g., methylol compounds of ethylene urea, which are used for the treatment of textiles.

Preferably, colorless, high-molecular, organic material is brightened also in the form of fibers. For the brightening of these fiber materials, a dispersion or solution of v-triazoles of the formula I according to the invention is advantageously used. The brightener dispersion or solution preferably has a content of 0.005 – 0.5 percent of v-triazole according to the invention, relative to the fiber material. In addition, the dispersion or solution can contain auxiliaries such as dispersing agents, e.g., condensation products of fatty alcohols or alkyl phenols containing 10 to 18 carbon atoms, with 15 to 25 moles of ethylene oxide, or condensation products of alkylmono- or polyamines containing 16 to 18 carbon atoms, with, at least, 10 moles of ethylene oxide, organic acids such as formic, oxalic or acetic acid, detergents, swelling agents such as di- or trichlorobenzenes, wetting agents such as sulphosuccinic acid alkyl ester, bleaching agents such as sodium chlorite, peroxides or hydrosulphites, as well as, optionally, brightening agents of other classes such as, e.g., derivatives of stilbene having affinity to cellulose.

The brightening of the fiber material with the aqueous brightener-treatment-bath is carried out either by the exhaust process, at temperatures of preferably 30° to 150° C, or by the padding process. In the latter case, the material is impregnated, e.g., with a 0.2 – 0.5 percent brightener preparation, and finished, e.g., by a dry or moist heat treatment, e.g., by steaming under 2 atmospheres pressure or, after a drying treatment, by a short dry heating to 180° – 220° C, whereby the fabric is simultaneously thermofixed. The thus treated fiber material is finally rinsed and dried.

Colorless, high-molecular, organic material optically brightened according to the invention, particularly the synthetic fiber material brightened in the exhaust process, has a pleasing, pure white, blue-violet to bluish fluorescent appearance; such material dyed in light shades and brightened according to the invention is distinguished by a pure shade.

The v-triazoles of the formula I according to the invention can also be added to detergents and these used for the brightening of textiles.

The content of optical brightener in the detergents is advantageously 0.001 – 0.5 percent, relative to the solid content in the detergent.

Washing liquors containing v-triazoles of the formula I according to the invention impart, during washing, to the textile fibers treated therewith, e.g., cellulose fibers or synthetic polyamide, polyester, polyolefin and cellulose ester fibers, a brilliant appearance in daylight. They can be used therefore, in particular, for the washing of these synthetic fibers or of the textiles or component parts of textiles made from such fibers, or for the washing of household linen goods.

The compounds of the formula I are produced according to the invention by splitting off one mole of water from a compound of the formula II or II',

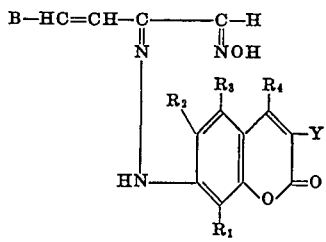

(II)

or

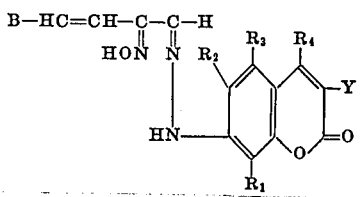

(II')

wherein B, Y and $R_1$ to $R_4$ represent the groups defined under formula I, under the action of an acid reacting condensation agent, optionally with heating.

Examples of acid reacting condensation agents are the hydrohalic acids, the inorganic anhydrides, phosphorus pentoxide and sulphur trioxide, the mixed inorganic/organic anhydrides such as the alkynoyl and aroyl, alkyl sulphonyl and arylsulphonyl halides, e.g., acetyl chloride, benzoyl chloride, toluene sulphochloride, as well as the purely organic anhydrides such as acetanhydride, benzoic acid anhydride, also the mixed anhydride of formic acid and acetic acid.

The condensation can be performed in the presence of organic solvents which are inert under the reaction conditions. Suitable as such are high-boiling hydrocarbons and halogenated hydrocarbons, e.g., chlorobenzene, dichlorobenzenes, xylenes; it is also possible to use inert, slightly or more strongly basic solvents, e.g., dimethylformamide, dimethylacetamide, or pyridine, picolines, quinolines. Depending on the substituents of the oxime hydrazones, ring closure can be effected by simply allowing the reaction mixture to stand, or it can be effected by heating the reaction mixture. Suitable reaction temperatures are those between room temperature and 150° C, preferably 100° – 150° C. Favorable results with regard to yields and purity of the final products are sometimes produced by the presence of basic catalysts such as anhydrous alkali metal salts or alkaline-earth metal salts of organic acids, e.g., sodium acetate or potassium acetate. The progression of the ring-closure reaction can be best followed in thin-layer chromatograms. The intermediary occurrence, when mixed inorganic/organic or purely organic acid anhydrides are used, of O-acylated intermediate stages is only of minor importance with regard to the course of the reaction.

As a modification of the process just described, the stated compounds are also obtained by ring closure being produced oxidatively in a compound of the formula II or II', and the obtained v-triazole-1-oxide compound being reduced with nascent hydrogen to a compound of the formula I.

Oxidative ring closure can be effected by the action of the most diverse oxidizing agents, whereby it is advisable to operate in solvents which are resistant to oxidation. In acid solution, e.g., acetic acid solution, bichromate or hydrogen peroxide are suitable oxidizing agents; in basic solvents, such as pyridine or pyridine/water mixtures, potassium ferricyanide is, for example, suitable. The generally applicable and therefore preferred process consists in oxidation with copper-(II)-sulphate in pyridine/water. It is not necessary thereby for stiochiometric amounts of copper to be used, since the monovalent copper formed during the reaction can be continually converted, by the blowing in of air or oxygen, again into the bivalent stage.

For the reduction of triazole oxides to the triazoles using known methods, the reduction with base metals and acids, such as zinc dust in acetic acid or in acetic acid/water mixtures is advantageously chosen. It is also possible to use for the reduction, however, salts of reducing acids of sulphur or phosphorus.

The starting materials for the production process or the modified process according to the invention can be obtained in a known manner, either by reaction of α-ketoaldehyde of the formula III

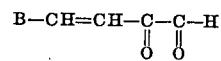

with 3-aryl-7-hydrazinocoumarins and hydroxylamine in any chosen sequence, nitrozation by nitrosation of monoketones of the formula IV

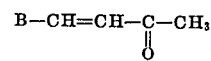

and reaction of the obtained oxime of the formula V

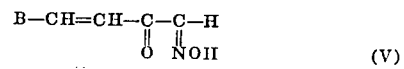 (V)

with a 3-aryl-7-hydrazinocoumarin, or by coupling of diazotized 3-aryl-7-aminocoumarins with ketones of the formula IV or ketoaldehydes of the formula VI

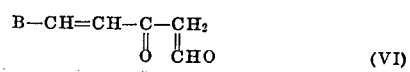 (VI)

and reaction of the azo compound with hydroxylamine.

Suitable 3-aryl-7-hydrazinocoumarins are, e.g., 3-phenyl-7-hydrazinocoumarin, 3-phenyl-6-methyl-7-hydrazinocoumarin, 3-(3-methylphenyl)-7-hydrazinocoumarin, 3-(4-methylphenyl)-7-hydrazinocoumarin, 3-(3,4-dimethylphenyl)-7-hydrazinocoumarin, 3-(3-chlorophenyl)-7-hydrazinocoumarin, 3-(4-chlorophenyl)-7-hydrazinocoumarin, 3-(2,4-dichlorophenyl)-7- hydrazinocoumarin, 3-(3,4-dichlorophenyl)-7-hydrazinocoumarin, 3-(4-fluorophenyl)-7-hydrazinocoumarin, 3-thienyl-(2)-7-hydrazinocoumarin, 3-(m-cyanophenyl)-7-hydrazinocoumarin, 3-(m-carboxyphenyl)-7-hydrazinocoumarin, 3-(m-methoxyphenyl)-7-hydrazinocoumarin. Such hydrazinocoumarins can be produced, for example, from the corresponding amino coumarins described in the Belgian Pat. No. 542,754 or in the Dutch Pat. specification No. 65,11305, using known methods.

Arylvinyl-v-triazoles of the coumarin series of the formula I according to the invention are, finally, also obtained by condensing under ring closure conditions a 2-hydroxyl-4-triazolyl-benzaldehyde of the formula VII,

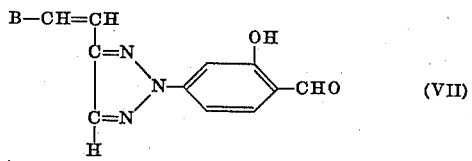

or a derivative thereof which reacts in a like manner under the reaction conditions, by methods known per se, with an optionally ring-substituted phenylacetic acid or with a functional derivative of this acid.

In the following examples, the temperatures are given in degrees Centigrade.

EXAMPLE 1

1.1

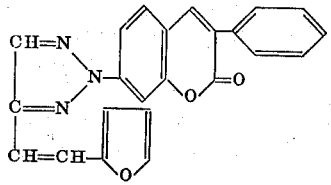

2-[3-Phenylcoumarinyl-(7)]-4-[2-(furyl-2)-vinyl]-v-triazole 17.7 g of furfural-2-isonitrosoacetone are added at room temperature to a suspension of 25.2 g of 3-phenyl-7-hydrazinocoumarin in 800 ml of methanol and 200 ml of 50 percent acetic acid and the reaction mixture is stirred for 6 hours at 54°–56°. After cooling, the brown-red suspension is filtered by suction, the filter residue is washed three times with 60 ml of methanol, and dried. 31.1 g of isonitroso-2-furfural-acetone-[3-phenylcoumarinyl-(7)]-hydrazone are obtained as a fine dark brown-red crystalline powder. Crude melting point: 191°–194° with decomposition.

31 g of the resultant oxime hydrazone are stirred, while excluding moisture, for 5 hours at 130°–135° with 23 g of anhydrous potassium acetate and 200 ml of acetanhydride. After cooling, the crystallized reaction product is filtered by suction, washed three times with 50 ml of 50 percent acetic acid and then with a large amount of water, and dried in vacuum at 60°. After recrystallization from toluene with the addition of bleaching earth, 14.3 g of 2-[3-phenylcoumarinyl-(7)]-4-[2-(furyl-2)-vinyl]-v-triazole are obtained as brilliant light yellow crystalls, m.p. 233°–234°. The v-triazole dissolves in chlorobenzene with a strongly pronounced blue fluorescence in daylight. The compound is excellently suitable for the brightening of textile material mad from polyesters, triacetate, polyamides or polypropylenes, either by the exhaustion process or by the thermosol process. Moreover, the compound can also be added to polyester and polypropylene spinning masses. Well brightened fibers are then obtained after spinning.

The furfural-2-isonitrosoacetone employed can be produced as follows: 17.5 g of isonitrosoacetone are dissolved under a nitrogen atmosphere with stirring and cooling at 10°–15° in 40.5 ml of 33 percent potassium hydroxide solution. Then 22.0 g of freshly distilled furfurol are added dropwise at 5°–10° during 25 minutes and after the exothermic reaction has subsided, again stirred at the same temperature for 15 minutes. The reaction solution is then well stirred twice with 75 ml of ether, and the ethereal phases are subsequently removed. After dilution of the aqueous phase with 130 ml of water, the mixture is adjusted, with continued stirring, to a pH of 4–5 with 50 percent acetic acid, whereby the furfural-2-isonitrosoacetone precipitates in very fine felted crystals. After 10 minutes the product is filtered with suction, washed with a little water and dried in vacuum at 40°. 26.8 g of crude furfural-2-isonitrosoacetone (81.3 percent of theory), having a melting point of 117°–119° with slight decomposition, are obtained. By recrystallization from chloroform, the compound can be purified and forms fine, felted, light yellowish crystalline needles, m.p. 119°–120°.

When furfural is replaced by an equivalent amount of one of the aldehydes listed below and reacted in the same or a similar manner as described above with isonitrosoacetone to obtain the corresponding isonitroso derivative which is in turn reacted with 3-phenyl-7-hydrazino-coumarin and the resultant oxime hydrazone is then dehydrated in a similar manner with acetanhydride and potassium acetate, the following v-triazoles are obtained having similar good properties:

from sodium 2-formyl-5-furansulfonate,
1.2   2-[3-phenylcoumarinyl-(7)]-4-[2-(furan-2-yl-5-sulfonic acid)-vinyl]-v-triazole;
from 2-formyl-5-furansulfonic acid ethyl amide,
1.3   2-[3-phenylcoumarinyl-(7)]-4-[2-(furan-2-yl-5-sulfonic acid-ethyl-amide)-vinyl]-v-triazole;
from 2-formyl-5-methylsulfonyl-furan,
1.4   2-[3-phenylcoumarinyl-(7)]-4-[2-(5-methyl-sulfonyl-furyl-2)-vinyl]-v-triazole;
from 2-formyl-5-furansulfonic acid-γ-dimethylaminopropylamide,
1.5   2-[3-phenylcoumarinyl-(7)]-4-[2-(furan-2-yl-5-sulfonic acid-γ-dimethylaminopropylamide)-vinyl]-v-triazole;
from 2-formyl-5-cyanofuran,
1.6   2-[3-phenylcoumarinyl-(7)]-4-[2-(5-cyanofuryl-2)-vinyl]-v-triazole;
from 2-formyl-5-carboxamido-furan,
1.7   2-[3-phenylcoumarinyl-(7)]-4-[2-(carboxamido-furyl-2)-vinyl]-v-triazole;
from 2-formyl-5-furan-carboxylic acid,
1.8   2-[3-phenylcoumarinal-(7)]-4-[2-(5-carboxyfuryl-2)-vinyl]-v-triazole;
from 2-formyl-5-furan-carboyxlic acid ethyl ester,
1.9   2-[3-phenylcoumarinyl-(7)]-4-[2-(5-carbethoxy-furyl-2)-vinyl]-v-triazole;
from 5-p-chlorophenyl-furfurol,
1.10   2-[3-phenylcoumarinyl-(7)]-4-[2-(5-p-chlorophenyl-furyl-2)-vinyl]-v-triazole;
from pyridin-4-aldehyde, 1.11 2-[3-phenylcoumarinyl-(7)]-4-[2-(pyridyl-4)-vinyl]-v-triazole;

from 1-phenyl-3,5-dimethyl-pyrazol-4-aldehyde, 1.12 2-[3-phenylcoumarinyl-(7)]-4-[2-(1-phenyl-3,5-dimethylpyrazolyl-4)-vinyl]-v-triazole;

from 2-phenyl-v-triazol-4-aldehyde, 1.13 2-[3-phenylcoumarinyl-(7)]-4-[2-(2-phenyl-v-triazolyl-4)-vinyl]-v-triazole;

from 2-formyl-4,6-diphenyl-s-triazine, 1.14 2-[3-phenylcoumarinyl-(7)]-4-[2-(4,6-diphenyl-s1triazinyl-2)-vinyl]-v-triazole.

EXAMPLE 2

2.1
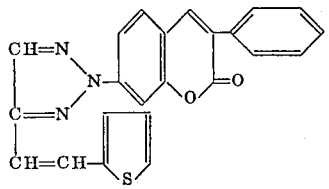

2-[3-Phenylcoumarinyl-(7)]-4-[2-(thienyl-2)-vinyl]-v-triazole 16.3 g of thienal-2-isonitrosoacetone (produced analogously to the last paragraph of Example 1.1) are added at room temperature to a suspension of 25.2 g of 3-phenyl-7-hydrazinocoumarin in a mixture of 800 ml of methanol and 200 ml of 50 percent acetic acid. Then the reaction mixture is stirred for 5 hours at 50°–55°. The initially dirty yellow suspension hereby rapidly changes into the rust-red colored, fine-crystalline isonitroso-2-thienalacetone-[3-phenylcoumarinyl-(7)]-hydrazone. After cooling, the precipitate is filtered off under suction, washed with methanol and dried in vacuum at 60° – 70°. 32.7 g of crude isonitroso-2-thienalacetone-[3-phenyl-coumarinyl-(7)]-hydrazone, m.p. 205° – 208°, with decomposition, are obtained.

A suspension of 27.0 g of the above-obtained oxime hydrazone in 275 ml of acetanhydride is heated, after the addition of 20.0 g of anhydrous potassium acetate, with stirring and while excluding moisture, for 5 hours at 130° – 135°. After cooling, the crystalline reaction product is filtered off by suction, washed three times with 40 ml of 50 percent acetic acid, then with water, and dried in vacuum. Crude yield: 18.15 g, corresponding to 70.3 percent of theory, m.p. 243° – 244°. By recrystallizing from chlorobenzene with bleaching earth, 12.2 g of 2-[3-phenylcoumarinyl-(7)]-4-[2-(thienyl-2)-vinyl]-v-triazole (47.3 percent of theory) are obtained in the form of brilliant yellow crystals, m.p. 244.5° – 245.5°. The new v-triazole dissolves in chlorobenzene with a strongly pronounced blue fluorescence in daylight.

The compound is excellently suitable for the optical brightening of fibers made from polyester, polyamide, polyacrylonitrile, 2½-acetate and triacetate by the exhaustion process together with detergents, or by the thermosol process. They can also be added to spinning masses, e.g., polyester spinning masses, whereby, after spinning, equally well brightened fibers are obtained.

2.2 When the thienal-2-isonitrosoacetone is replaced by the equivalent amount of 5-phenylthienal-2-isonitrosoacetone and the procedure described above is followed, 2-[3-phenylcoumarinyl-(7)]-4-[2-(5-phenylthienyl-2)-vinyl]-v-triazole having similar properties is obtained.

EXAMPLE 3

To 100 ml of water are added 0.2 g of trichlorobenzene and to this is added a solution of 0.0015 g of the triazole derivative described in Example 1.1 in 1.5 ml of ethylene glycol monomethyl ether. The thus obtained liquor is heated to 60°, and 3 g of a polyester fabric are introduced. The temperature is raised within 10–15 minutes to 95°–98° and this temperature is maintained for 1 hour. The fabric is then rinsed for 2 minutes in running water, and subsequently dried for 20 minutes at 60°. The fabric treated in this manner has a white, brilliant appearance.

Similar results are obtained by proceeding as described in the above example but using, instead of the brightener given there, one of the other v-triazoles described in Example 1 or 2.

The trichlorobenzene used as carrier in this example and in the following Examples 4 and 7 is a mixture of 76 parts of trichlorobenzene and 27 parts of various emulsifiers.

EXAMPLE 4

To 100 ml of water are added 0.2 g of trichlorobenzene, 0.2 g of 80 percent sodium chlorite, 0.2 g of sodium nitrate and 0.2 g of oxalic acid, or an equivalent amount of another organic or inorganic acid suitable for this purpose. A stock solution is prepared of the brightener produced according to Example 1.1 by dissolving 1 g of the stated brightener in 1000 ml of ethylene glycol monomethyl ether. An amount of 1.5 ml of this stock solution is added to the above described solution. This liquor is heated to 60°; then 3 g of a polyester fabric are introduced, and the temperature is raised in the course of 15–20 minutes to 95°–98°; the bath is left at this temperature for 60 minutes. The fabric is thereupon rinsed and dried. The thus treated fabric has a white, brilliant appearance.

A likewise clearly brightened fabric is obtained by proceeding as described in this example but using, instead of the stated brightener, the triazoles according to Examples 1.2 to 1.14 and 2.

EXAMPLE 5

To 100 ml of water are added 0.4 g of detergent of the following composition:

| | |
|---|---|
| dodecylbenzene sulphonate | 16 % |
| fatty alcohol sulphonate | 4 % |
| Na-tripolyphosphate | 35 % |
| tetrasodium pyrophosphate | 7 % |
| magnesium silicate | 2 % |
| sodium silicate | 7 % |
| carboxymethyl cellulose | 1 % |
| ethylenediaminetetraacetic acid sodium salt | 0.5 % |
| sodium sulphate | 25 % |
| water | 2.5 % |

Instead of sodium sulphate, the detergent can also contain 10–20 percent of sodium perborate, or another agent releasing oxygen.

An amount of 1.0 g of the optical brightener obtainable according to Example 2.1 is dissolved in 1000 ml of ethylene glycol monomethyl ether. 0.8 ml of this stock solution are added to the above described aqueous solution. The thus obtained washing liquor is heated to 55°–60, and 3 g of a polyester fabric are introduced. The fabric is washed at this temperature for 30 minutes; it is then rinsed for 2 minutes in running water, and subsequently dried for 20 minutes at 60°. The fabric treated in this manner exhibits a high degree of whiteness.

Similar results are obtained by proceeding as described above but using, instead of the above brightener, the brightener described in the Examples 1.1 to 1.14.

EXAMPLE 6

To 100 ml of water are added 0.2 g of di-n-octylsodium sulphosuccinate. A 10 percent sand milling of the optical brightener according to Example 1.1 is produced. An amount of 3 g of this sand milling is added to the above described aqueous solution. A polyester fabric is padded with this solution at 20° (squeezing effect 50–60 percent, roller pressure 30 kg/cm$^2$, speed 3 m/minute). The fabric is dried for 20 minutes at ca. 60°; and the dry fabric is then fixed for 30 seconds at 200°. The thus treated fabric has a white, brilliant appearance.

EXAMPLE 7

To 290 ml of water are added 0.3 ml of alkylpolyglycol ether and 0.15 ml of trichlorobenzene. A solution of the optical brightener according to Example 1.1 is produced by dissolving 1 g thereof in 1000 ml of ethylene glycol monomethyl ether. An amount of 4.5 ml of this stock solution is added to the above described solution. The liquor is heated to 60°, and 15 g of polyester fabric are then introduced into the solution. The temperature is raised within 15–20 minutes to 130° and this temperature is maintained for 30 minutes. The bath is cooled within 10–15 minutes to 60°; the fabric is rinsed, dried for 20 minutes at 60°, and afterwards thermofixed for 30 seconds at 200°. The thus treated fabric has a white, brilliant appearance.

Similar results are obtained by proceeding as described above, but using the brighteners stated in Examples 1.2 to 1.14 and 2.

EXAMPLE 8

To 100 ml of water are added 0.4 g of detergent as given in Example 10. A solution is prepared of the optical brightener according to Example 1.1 by dissolving 1 g thereof in 1000 ml of ethylene glycol monomethyl ether. An amount of 2 ml of this stock solution is added to the above described liquor; this is then heated to 60°, and 3 g of nylon fabric are introduced into the solution. The fabric is treated at this temperature for 30 minutes. After rinsing and drying, the fabric has a brilliant, white appearance.

EXAMPLE 9

To 100 ml of water are added 0.06 g of alkylpolyglycol ether. A solution is prepared of the optical brightener according to Example 1.1 by dissolving 1 g thereof in 1000 ml of dimethylformamide. An amount of 3 ml of this stock solution is added to the above described aqueous solution. This liquor is heated to 60°, then 3 g of nylon fabric are introduced into this solution. The temperature is raised within 10–15 minutes to 92°–95°, and this temperature is maintained for 30 minutes. The fabric is afterwards rinsed and dried. The thus treated fabric has a white, brilliant appearance.

Similar results are obtained, with the same manner of application, using the brighteners according to Examples 1.2 to 1.14 and 2.

EXAMPLE 10

To 100 ml of water are added 0.12 ml of 85 percent formic acid and 0.06 g of alkylpolyglycol ether. A solution is prepared of the optical brightener according to Example 1.1 by dissolving 1 g thereof in 1000 ml of dimethylformamide. An amount of 3 ml of this stock solution is added to the above described aqueous solution. The aqueous solution containing the brightener is heated to 60°; then 3 g of nylon fabric are introduced into this liquor. The temperature is raised within 10–15 minutes to 92°–95°, and this temperature is maintained for 30 minutes. The fabric is thereupon rinsed and dried. The thus treated fabric has a white and brilliant appearance.

Similar results are obtained, using the same manner of application as described above, with the brighteners described in Examples 1.2 to 1.14 and 2.

EXAMPLE 11

To 100 ml of water are added 1 ml of 85 percent formic acid and 0.06 g of alkylpolyglycol ether. A solution is prepared of the optical brightener according to Example 1.1 by dissolving 1 g thereof in 100 ml of ethylene glycol monomethyl ether. An amount of 1.5 ml of this stock solution is added to the above described aqueous solution. This aqueous solution containing the brightener is heated to 60°; then 3 g of "Orlon" fabric are introduced into the solution. The temperature is raised within 10–15 minutes to 95°–98° and this temperature is maintained for 60 minutes. The fabric is then rinsed and dried.

The thus treated fabric has a white, brilliant appearance.

EXAMPLE 12

To 100 ml of water are added 0.06 ml of 40 percent acetic acid and 0.06 ml of alkylpolyglycol ether. A solution is prepared of the optical brightener according to Example 1.1 by dissolving 1 g thereof in 1000 ml of dimethylformamide. An amount of 6 ml of this stock solution is added to the above described aqueous solution. This aqueous solution containing the brightener is heated to 40°; then 3 g of acetate fabric are introduced into the solution. The temperature is raised within 10–15 minutes to 75°–80°, and this temperature is maintained for 30 minutes. The fabric is rinsed and dried. The thus treated fabric has a white, brilliant appearance.

Similar results are obtained by proceeding as described above, but using the brighteners stated in Examples 1.2 to 1.14 and 2.

EXAMPLE 13

To 100 ml of water are added 0.06 ml of 40 percent acetic acid and 0.06 g of alkylpolyglycol ether. A solution is prepared of the optical brightener according to Example 1.1 by dissolving 1 g thereof in 1000 ml of dimethylformamide. An amount of 1.5 ml of this stock solution is added to the above described aqueous solution. This liquor is heated to 60°; then 3 g of polypropylene fabric ("Meraklon") are introduced into this solution. The temperature is raised within 10–15 minutes to 95°–98° and this temperature is maintained for 30 minutes. The fabric is rinsed and dried. The thus treated fabric has a white and brilliant appearance.

Similar results are obtained, using the same manner of application, with the brighteners according to Examples 1.2 to 1.14 and 2.

EXAMPLE 14

To 95 ml of water are added 0.06 ml of 40 percent acetic acid and 0.06 ml of alkylpolyglycol ether. A solution is prepared of the optical brightener according to Example 1.1 by dissolving 1 g thereof in 1000 ml of dimethylformamide. An amount of 6 ml of this stock solution is added to the above described aqueous solution. This aqueous solution containing the optical brightener is heated to 60°; then 3 g of triacetate fabric are introduced into the solution. The temperature is raised within 10–15 minutes to 95°–98° and this temperature is maintained for 30 minutes. The fabric is rinsed and dried. The thus treated fabric has a white and brilliant appearance.

Similar results are obtained, using the same manner of application, with the brighteners according to Examples 1.2 to 1.14 and 2.

EXAMPLE 15

100 parts of polypropylene with 0.5 g of titanium dioxide and 0.05 g of the optical brightener according to Example 1.1 are homogenized at 200° in a kneading machine. Under inert gas at 2–3 atm. and at a temperature of 280°–300°, the melt is spun, by known methods, through spinning nozzles. The thus obtained polypropylene threads are distinguished by a high degree of whiteness.

EXAMPLE 16

1000 Parts of polyester granulate made from polyterephthalic acid ethylene glycol are intimately mixed with 0.25 part of the brightener produced according to Example 1.1; and the mixture is then spun under nitrogen from an extruder at a temperature of 265°–285°, in a known manner, through a spinning-nozzle into threads. The thus obtained polyester threads have a brilliant white appearance.

Instead of the brightener used in this example, it is also possible to use the brightener according to the Examples 1.2 to 1.14 and 2 whereby equally good results are obtained.

EXAMPLE 17

In a high-grade alloy steel autoclave provided with a stirrer, a gas-inlet tube, a vacuum arrangement, a descending condenser, and a heating jacket, 388 g of benzene-1,4-dicarboxylic acid dimethyl ester, 300 g of 1,2-ethanediol and 0.4 g of antimonous oxide are heated, whilst pure nitrogen is blown through, to 200° external temperature, and held for 3 hours at this temperature, whereby methanol slowly distills off. With the exclusion of air, 0.4 g of the optical brightener according to Example 1.1, dissolved in 40 g of 1,2-ethanediol, are carefully fed into the autoclave, after the temperature has been allowed to fall to 190°. After the addition is completed, the temperature is raised within one hour to 285° external temperature, whereby 1,2-ethanediol distills off. The autoclave is then put under vacuum, the pressure slowly being reduced to 0.2 Torr; and condensation is completed during 3 hours under these conditions. Vigorous stirring is maintained during this operation. The liquid condensation polymer is then extruded with nitrogen through the nozzle in the base. From the thus obtained polymer, monofilaments having a brilliant white appearance can be produced.

Instead of the brightener used in this example, also a brightener according to Examples 1.2 to 1.14 and 2 can be used with the same degree of success.

EXAMPLE 18

To 100 ml of water are added 0.12 ml of 85 percent formic acid. A solution is produced of the optical brightener according to Example 1.1 by dissolving 3.7 g thereof in 1000 ml of water. An amount of 3 ml of this stock solution is added to the above described solution. This aqueous solution containing the brightener is heated to 60°; then 3 g of nylon fabric are introduced into the solution. The temperature is raised within 10–15 minutes to 92°–95°, and the liquor is held at this temperature for 30 minutes. The fabric is then rinsed for 2 minutes in running water, and afterwards dried for 20 minutes at 60°. The thus treated fabric has a white and brilliant appearance.

EXAMPLE 19

To 100 ml of water are added 0.2 g of sodium nitrate, 0.2 g of sodium chlorite and 0.2 g of oxalic acid. A solution is prepared of the optical brightener according to Example 1.1 by dissolving 3.7 g thereof in 1000 ml of water. An amount of 2 ml of this stock solution is added to the above described solution. This aqueous solution containing the brightener is heated to 40°; then 3 g of desized, unbleached cotton fabric are introduced into the solution. The temperature is raised within 10–15 minutes to 85°, and the liquor is held at this temperature during 60 minutes. The fabric is then rinsed in cold running water, and subsequently dried for 20 minutes at 60°.

The thus treated fabric has a pleasing white appearance.

Instead of oxalic acid, it is also possible to use an equivalent amount of another organic, or also inorganic acid.

I claim:

1. A heterocyclic substituted v-triazole of the coumarin series of the formula:

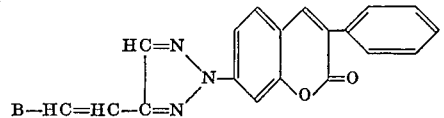

wherein
B represents a member selected from the group consisting of 1-phenyl-3,5-dimethyl-pyrazol-4-yl, 2-phenyl-v-triazol-4-yl and 4,6-diphenyl-5-triazin-2-yl.

2. The compound of claim 1 which is 2-[3-phenyl-coumarinyl-(7)]-4-[2-(1-phenyl-3,5-dimethyl-pyrazolyl-4)-vinyl]-v-triazole.

3. The compound of claim 1 which is 2-[3-phenyl-coumarinyl-(7)]-4-[2-(2-phenyl-v-triazolyl-4)-vinyl]-v-triazole.

4. The compound of claim 1 which is 2-[3-phenyl-coumarinyl-(7)]-4-[2-(4,6-diphenyl-s-triazinyl-2)-vinyl]-v-triazole.

* * * * *